United States Patent [19]

Shields

[11] 4,063,417
[45] Dec. 20, 1977

[54] POWER GENERATING SYSTEM EMPLOYING GEOTHERMALLY HEATED FLUID

[75] Inventor: J. Rodger Shields, Pittsburgh, Pa.

[73] Assignee: Carrier Corporation, Syracuse, N.Y.

[21] Appl. No.: 655,178

[22] Filed: Feb. 4, 1976

[51] Int. Cl.² ............................................. F03G 7/00
[52] U.S. Cl. ....................................... 60/641; 60/715
[58] Field of Search ................................ 60/641, 715

[56] References Cited

U.S. PATENT DOCUMENTS

| 3,862,545 | 1/1975 | Ellis et al. | 60/641 |
| 3,988,895 | 11/1976 | Sheinbaum | 60/641 |

Primary Examiner—Allen M. Ostrager

Attorney, Agent, or Firm—J. Raymond Curtin; Barry E. Deutsch

[57] ABSTRACT

Geothermally heated fluid is supplied to a nozzle of the first stage of a hydraulic turbine. The water constituent of the geothermally heated fluid is directed by the nozzle against the wheel of the hydraulic turbine to cause the wheel to rotate. A first generator is coupled to the wheel whereby rotation of the wheel results in the generation of electricity. A portion of the geothermally heated fluid passing through the nozzle flashes to a vapor phase. The vapor is delivered to the first stage of a vapor driven turbine. The vapor passes through the wheel of the turbine which results in rotation thereof. A second generator is coupled to the wheel of the vapor driven turbine whereby rotation of the wheel results in additional generation of electricity.

12 Claims, 3 Drawing Figures

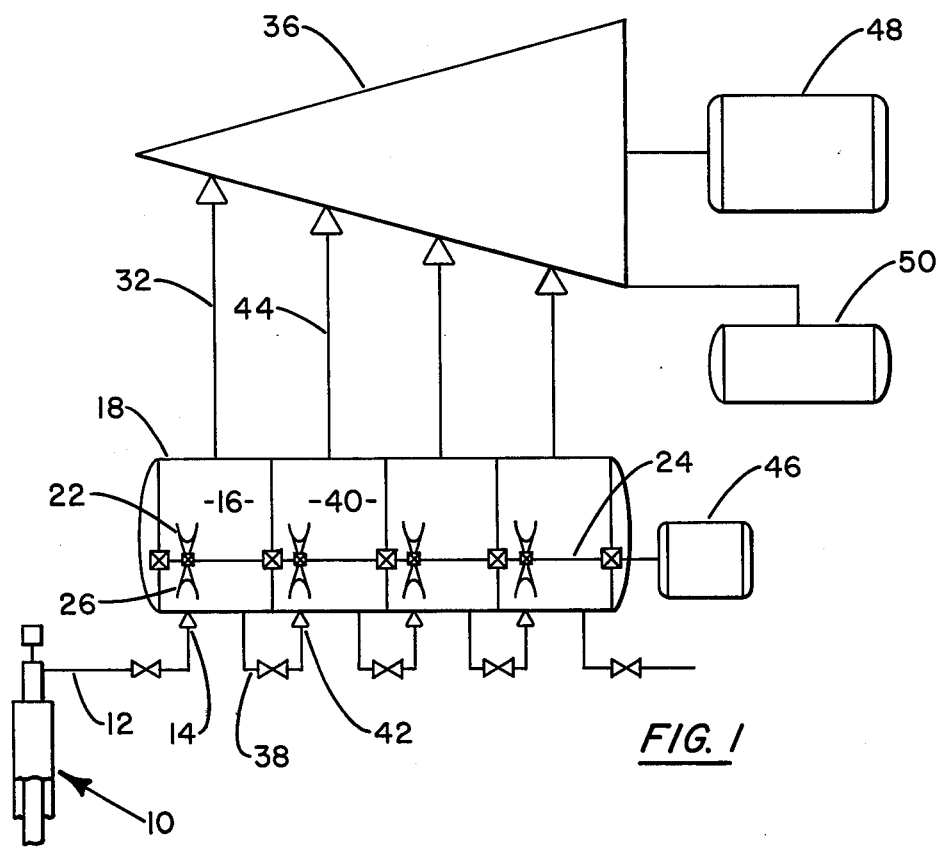
FIG. 1
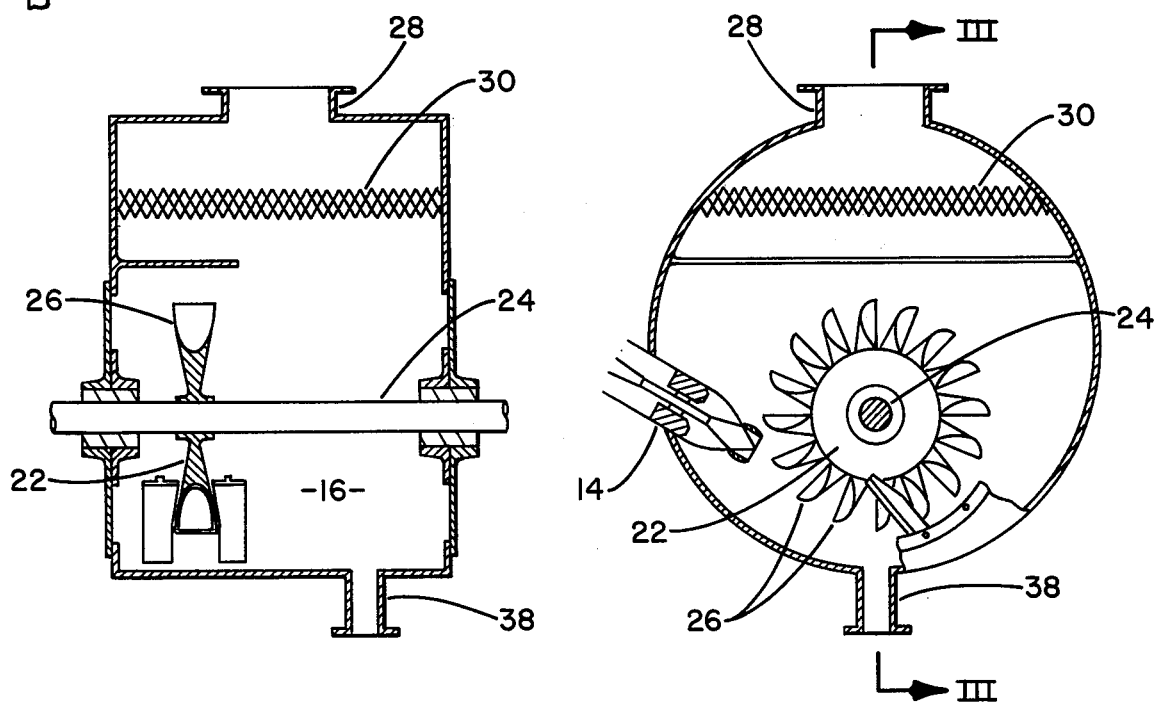
FIG. 3
FIG. 2

1

POWER GENERATING SYSTEM EMPLOYING GEOTHERMALLY HEATED FLUID

BACKGROUND OF THE INVENTION

This invention relates to power generating systems, and in particular, to such systems employing geothermally heated fluid.

One of the dark clouds hovering over the economic future of mankind is the fact that the known resources of fossil fuels are being depleted at a relatively rapid rate. In fact, it is estimated that such known resources will be depleted sometime during the twenty-first century if current growth rates are continued. Vast sums of money are being invested in research by the industrial nations to develop alternative sources of energy.

In searching for new sources of energy, one of the chief desirable characteristics for such new source is that such source be of a non-polluting type. For example, the utilization of nuclear energy has been partially limited by the fear of radiation pollution affecting the nearby populous. In addition, there is a further fear of thermal pollution of the streams, lakes or rivers used as the heat sink for the nuclear generating plants.

A potential source of non-polluting energy is the development and utilization of geothermal heat. Currently, in several parts of the world, for example, Northern California, Italy, and Japan, geothermal fluids are employed as the source of energy for the generation of power. The geothermal fields thus employed have been frequently referred to as "dry steam" fields. That is to say, the geothermal fluid in the fields at the wellhead is steam rather than liquid water. Heretofore, it has been the practice to develop only the dry steam fields as the geothermal steam may be directly employed to drive a vapor driven turbine.

Liquid dominated geothermal fields are about twenty times as abundant as dry steam fields. However, such liquid dominated fields have not been developed as extensively as is desirable for several reasons. First, the geothermal fluid, when in its liquid phase, is quite corrosive and includes much particulate matter entrained therein. Accordingly, it has been the practice to separate the geothermal water from the geothermal steam and to only employ the steam to produce power. The cost of separating the steam from the water constituent of the geothermal fluid has increased the initial cost and complexity of providing the geothermal generating system. In addition, the efficiency of such systems wherein only a small portion of the available fluid is used is not very high.

Many systems have been proposed to indirectly employ the geothermal fluid to heat a working fluid, for example isobutane, which is then directly employed to drive a tubine. An example of a system of this type is disclosed in U.S. Pat. No. 3,795,103, issued Mar. 5, 1974. U.S. Pat. No. 3,751,673, issued Aug. 7, 1973, is illustrative of another type of system whereby the geothermal fluid is directed through a helical screw expander so that the water constituent of the fluid is flashed to steam to drive a generator coupled to the fluid expander.

The present invention relates to a system employing geothermal fluid as the source of energy having improved efficiency whereby substantially all of the energy from the geothermal wells may be utilized.

SUMMARY OF THE INVENTION

Accordingly, it is an object of this invention to improve the efficiency of power generating systems employing geothermal fluid as the source of energy.

It is another object of this invention to substantially increase the availability and potential of geothermal fluid as a source of energy.

It is a further object of this invention to directly accept the water constituent of the geothermal fluid in a power generating device.

It is a further object of this invention to dynamically reduce the pressure of the geothermal fluid to flash a portion of the water constituent to steam and to thereafter employ the steam as a source of energy for generating additional power.

These and other objects of the present invention are attained in an electrical power generating system employing geothermally heated fluid as the source of energy. The geothermally heated fluid includes water at substantially its saturation temperature as a substantial portion thereof. The geothermal fluid is supplied through a nozzle to the first stage of a hydraulic turbine having an output shaft coupled to the wheel of the turbine. The water constituent of the geothermal fluid is directed by the nozzle against the wheel to cause the wheel to rotate. A portion of the fluid is flashed to a vapor phase as a result of the geothermal fluid passing through the nozzle. The flashed vapor is directed to a first stage of a vapor driven turbine. The wheel is turned as a result of the passage of the vapor therethrough. First and second generators are respectively coupled to the output shafts of the hydraulic and vapor driven turbines.

BRIEF DESCRIPTION OF THE DRAWING

FIG. 1 schematically represents a power generating system in accordance with the instant invention;

FIG. 2 is a sectional view of a portion of the hydraulic turbine which may be used in the instant invention; and FIG. 3 is a sectional view taken along lines III—III of FIG. 2.

DESCRIPTION OF THE PREFERRED EMBODIMENT

Referring now to the drawing, there is disclosed a preferred embodiment of the present invention. In referring to the various figures of the drawing, like numerals shall refer to like parts.

Referring particularly to FIG. 1, there is schematically illustrated a power generating system including a source of geothermally heated fluid, shown as a well 10. For purposes of illustration, it is assumed the hot fluid comes from the geothermal well and contains a large amount of salt and dissolved minerals. At the surface of the well, the fluid may be at a temperature between 350° F to 600° F (although rarely above 375° F) and at a pressure between 80 to 90 psig or even higher. It is further assumed that the fluid will be entirely liquid or will comprise a mixture of steam and water.

The hot geothermal fluid is led from well 10 via conduit 12 to nozzle 14. Nozzle 14 is located adjacent the first stage 16 of a hydraulic turbine 18.

The hydraulic turbine is preferably of the impulse type. A typical impulse turbine, known to the art as a Pelton wheel, is shown in detail in FIGS. 2 and 3.

Hydraulic impulse turbine 18 includes wheel 22 coupled to output shaft 24. Wheel 22 comprises a plurality of buckets or blades 26.

Nozzle 14 directs the water constituent of the geothermal fluid against the buckets 26 of wheel 22. The centerline of the water jet from the nozzle is tangent to the path of the center of the buckets as the buckets rotate.

The geothermal fluid discharged from nozzle 14 undergoes a significant reduction in pressure. Accordingly, a portion of the geothermal fluid flashes to a vapor phase. A further portion of the fluid will flash into vapor upon contacting the bucket or wheel of the impulse turbine. The vaporous fluid passes upwardly and is discharged from the impulse turbine through outlet 28. A demistor or similar filter means 30 is disposed upstream of outlet 28 to remove particulate matter entrained in the vaporous geothermal fluid. Outlet 28 communicates with conduit 32 which delivers the vaporous geothermal fluid into the first stage of a vapor driven turbine 36. Depending upon the pressure and temperature at which the fluid is supplied to turbine 18, the vaporous fluid supplied to turbine 36 may be superheated.

Preferably, the hydraulic impulse turbine includes more than one stage. In the illustrated embodiment, the turbine has four stages. The fluid employed to drive the wheel in the first stage is discharged through outlet 38 and passes into the second stage 40 of the impulse turbine via a second nozzle 42. As in the first stage, a portion of the fluid flashes to vapor. The remaining water constituent of the geothermal fluid is directed by nozzle 42 against the wheel forming the second stage of the hydraulic turbine. Vapor formed in the second stage of the hydraulic turbine is delivered via conduit means 44 to the second stage of the vapor driven turbine. In each successive stage of the hydraulic turbine, a portion of the geothermal fluid supplied thereto flashes to its vapor state and is supplied to a corresponding stage of the vapor turbine. The remaining water constituent of the geothermal fluid is employed to rotate the wheel of such successive stage of the hydraulic turbine. The number of stages employed in the hydraulic turbines and steam turbines will vary as a function of the pressures at the inlet to the hydraulic and steam turbines and further as a function of the condensing water temperature at the steam turbine exhaust.

Each of the turbines has power generating means, for example generators 46 and 48 coupled thereto. Rotation of the wheels comprising the stages of the hydraulic and vaporous turbines will result in the generators generating electricity for use in various applications. A condenser or similar means 50 is employed to condense the vaporous geothermal fluid exiting from the last stage of the vapor driven turbine.

The present invention provides a system which directly accepts and utilizes the water constituent of the geothermal fluid and in addition, dynamically reduces the pressure of the fluid to produce steam which may also be employed in the generation of power.

While a preferred embodiment of the instant invention has been described and illustrated, the invention should not be limited thereto but may be otherwise embodied within the scope of the following claims.

I claim:

1. A method of generating electrical power comprising the steps of:

providing a constant supply of geothermally heated fluid including water at substantially its saturation temperature as a substantial portion thereof;

supplying said geothermally heated fluid through a nozzle to the first stage of a hydraulic turbine having an output shaft coupled to the wheel of said turbine, with a portion of said fluid flashing to a vapor phase as a result of the fluid passing through said nozzle, and with the water constituent of said fluid being directed by said nozzle against the wheel to cause the wheel to rotate;

coupling the output shaft of said hydraulic turbine to a first generator for generating electricity;

supplying the flashed vapor from said hydraulic turbine to the first stage of a vapor driven turbine having an output shaft coupled to the wheel of said vapor driven turbine, with said wheel turning as a result of the passage of said vapor therethrough; and coupling the output shaft of said vapor driven turbine to a second generator for generating electricity.

2. The method in accordance with claim 1 wherein said hydraulic turbine is of the impulse type.

3. The method in accordance with claim 1 wherein the water utilized to drive the wheel in the first stage of said hydraulic turbine is directed through a second nozzle then against a wheel of a second stage of said hydraulic turbine, with the vapor formed as a result of the fluid passing through said nozzle being supplied to a second stage of said vapor driven turbine.

4. A method in accordance with claim 1 wherein both the hydraulic turbine and vapor driven turbine have further stages, with each successive stage of the hydraulic turbine having water supplied thereto from a preceding stage, and each successive stage of said vapor driven turbine having vapor supplied thereto from a corresponding stage of the hydraulic turbine.

5. An electrical power generating system comprising:

a source of geothermally heated fluid including water at substantially its saturation temperature as a significant constituent thereof;

a hydraulic impulse turbine including a nozzle connected to said source of geothermally heated fluid and operable to direct the water constituent of said fluid against the wheel of said hydraulic turbine, resulting in rotation of said wheel with a portion of said fluid flashing to a vapor phase as a result of the fluid passing through said nozzle;

a first generator operatively coupled to said hydraulic impulse turbine to generate electricity upon rotation of said turbine wheel thereof;

a vapor driven turbine including conduit means to supply said vapor generated in said hydraulic turbine to said vapor driven turbine with the wheel of said turbine turning as a result of the passage of said vapor therethrough; and a second generator operatively coupled to said vapor driven turbine to generate electricity upon rotation of the turbine wheel thereof.

6. A system in accordance with claim 5 wherein said hydraulic turbine is of the impulse type.

7. A system in accordance with claim 5 wherein both the hydraulic turbine and vapor driven turbine have further stages, with each successive stage of the hydraulic turbine having water supplied thereto from a preceding stage, and each successive stage of said vapor turbine having vapor supplied thereto from a corresponding stage of the hydraulic turbine.

8. In a method of generating power by employing geothermally heated fluid including water at substantially its saturation temperature as a substantial portion thereof, the improvement comprising the steps of:
dynamically expanding the geothermally heated fluid in a first prime mover to cause the first prime mover to operate with a portion of said expanded fluid flashing to vapor; and
supplying the flashed vapor produced by the expansion of said fluid to a second prime mover to cause the second prime mover to operate.

9. A method in accordance with claim 8 wherein each of the prime movers have more than one stage, with each successive stage of the first prime mover having geothermally heated fluid supplied thereto from a preceding stage, said fluid being dynamically expanded in each successive stage, said flashed vapor being supplied to a corresponding stage of said second prime mover.

10. In a system employing geothermally heated fluid including water at substantially its saturation temperature to generate power, the improvement comprising:
a first prime mover to receive said geothermally heated fluid wherein the fluid is dynamically expanded, with a portion thereof flashing to vapor; and
a second prime mover to receive said flashed vapor from said first prime mover.

11. In a system in accordance with claim 10 wherein each of the prime movers have more than one stage, with each successive stage of the first prime mover having geothermally heated fluid supplied thereto from a preceding stage, said fluid being dynamically expanded in each successive stage, said flashed vapor being supplied to a corresponding stage of said second prime mover.

12. In a system in accordance with claim 10 wherein said flashed vapor is superheated.

* * * * *